United States Patent [19]

Karnopp

[11] Patent Number: 5,189,613
[45] Date of Patent: Feb. 23, 1993

[54] DEVICE FOR ADJUSTING THE STEERING ANGLE OF VEHICLE WHEELS

[75] Inventor: Dean Karnopp, Davis, Calif.

[73] Assignee: Robert Bosch GmbH, Stuttgart, Fed. Rep. of Germany

[21] Appl. No.: 646,780

[22] PCT Filed: May 16, 1990

[86] PCT No.: PCT/DE90/00362
§ 371 Date: Jan. 11, 1991
§ 102(e) Date: Jan. 11, 1991

[87] PCT Pub. No.: WO91/00207
PCT Pub. Date: Jan. 10, 1991

[30] Foreign Application Priority Data

Jun. 24, 1989 [DE] Fed. Rep. of Germany ........ 3920853

[51] Int. Cl.$^5$ .............................................. B62D 5/04
[52] U.S. Cl. ................... 364/424.05; 180/142; 180/79.1
[58] Field of Search ............ 369/424.01, 424.05; 180/79.1, 141-142

[56] References Cited

U.S. PATENT DOCUMENTS

| | | | |
|---|---|---|---|
| 4,794,536 | 12/1988 | Eto et al. | 364/424.05 |
| 4,803,629 | 2/1989 | Noto et al. | 364/424.05 |
| 4,840,389 | 6/1989 | Kawabe et al. | 280/91 |
| 4,967,865 | 11/1990 | Schindler | 180/79.1 |
| 4,996,657 | 2/1991 | Shiraishi et al. | 364/559 |

FOREIGN PATENT DOCUMENTS

| | | |
|---|---|---|
| 0312096 | 4/1989 | European Pat. Off. |
| 5945268 | 3/1984 | Japan |
| 60206783 | 10/1985 | Japan |
| 62241769 | 10/1987 | Japan |

*Primary Examiner*—Thomas G. Black
*Attorney, Agent, or Firm*—Baker & Daniels

[57] ABSTRACT

An apparatus for adjusting the steering angle of at least one steerable wheel of the vehicle includes sensor means for sensing the steering angle of the vehicle steering wheel, the speed of the vehicle, and a vehicle state variable of the vehicle. The steering angle is selected by a driver of the vehicle. The sensor means generates an output signal. A controller is connected to the sensor means and receives the sensor means output signal. The controller determines a reference value for said vehicle state variable which is independent of the vehicle speed and the steering angle. The steering angle is generated independently of the reference value. The controller corrects the steering angle of the steerable wheel such that the vehicle has an understeering or neutral steering performance.

28 Claims, 1 Drawing Sheet

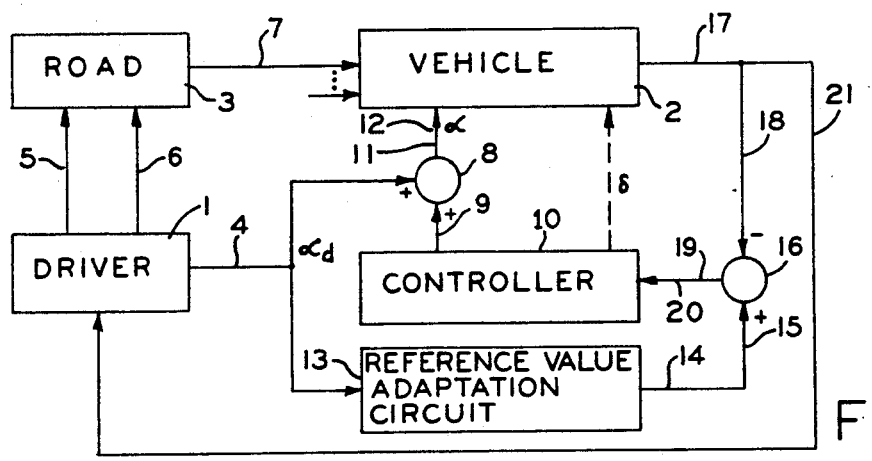
FIG_1
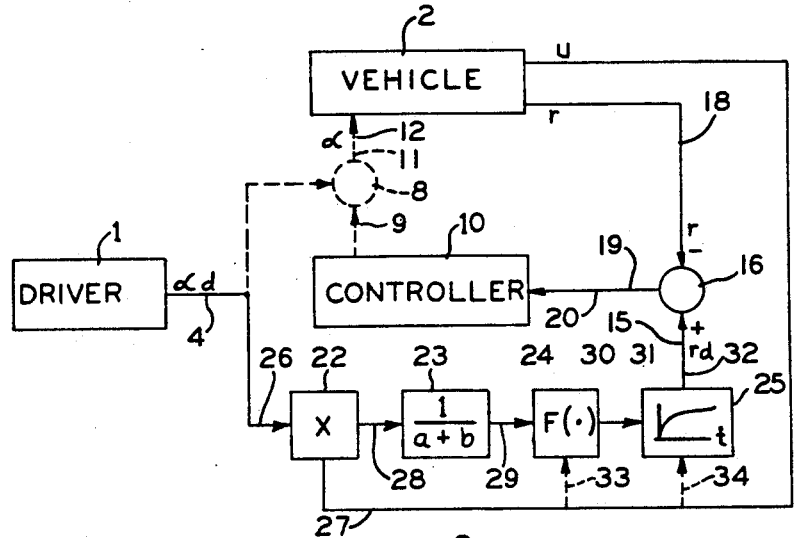
FIG_2
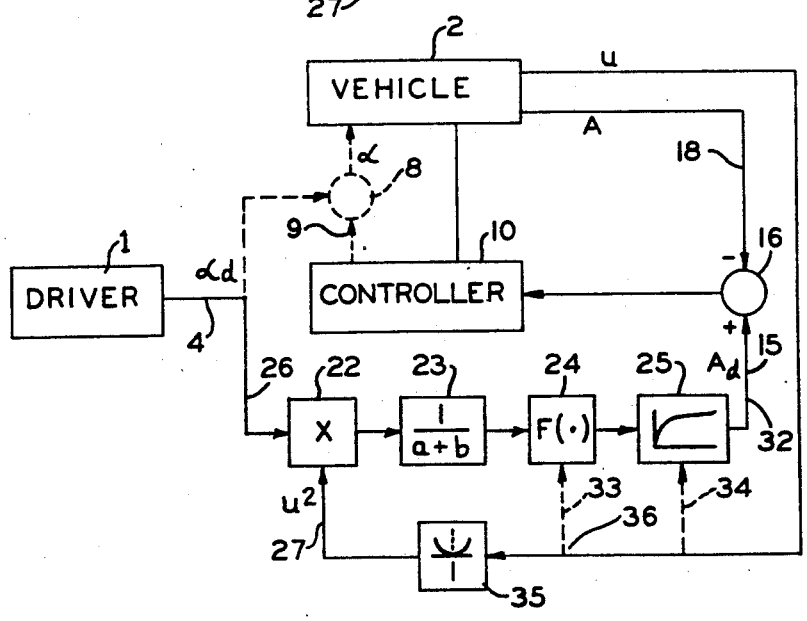
FIG_3

DEVICE FOR ADJUSTING THE STEERING ANGLE OF VEHICLE WHEELS

BACKGROUND OF THE INVENTION

The invention relates to a device for adjusting the steering angle of at least one steerable wheel of a vehicle, having sensor means for detecting the locking angle of a steering wheel of the vehicle and having a controller which corrects the steering angle of the wheel generated by steering wheel adjustment as a function of a reference value which is dependent on the driving speed and the locking angle.

Conventional cars have large differences in respect of their reaction to steering commands, brake maneuvers and acceleration processes. Small sports cars react differently from, for example, large limousines. Furthermore, the reaction of a specific vehicle is dependent on the loading, on the state of its tires and on the condition of the road etc., so that the driver always has to carry out an adaptive control.

The chassis characteristics can be improved by active or semi active suspension/damping arrangements. These are to be understood as actuators lying parallel to the vehicle suspension which are influenced as a function of the driving condition variables present in each case.

In conventional vehicles, a pleasant behavior when driving around bends, namely a neutral or understeering behavior is desired.

The dynamic characteristics of a vehicle are of course also determined by means of the steering. On the one hand, it is intended to relieve the driver and on the other hand to achieve a high degree of driving safety. Thus, the German Offenlegungsschrift 37 34 477 discloses a device for controlling the steering angle of the wheels of a vehicle in which the steering wheel locking angle and the driving speed are fed to a controller via a reference value determining system, the controller driving the actuator for steerable wheels. The controller also receives data from a vehicle-monitoring system.

SUMMARY OF THE INVENTION

The device according to the present invention for adjusting the steering angle of at least one steerable wheel of a vehicle has the advantage, in contrast with the prior art of providing a neutral or understeering behavior of the vehicle when driving around bends as a result of an evaluation stage, so that, as far as possible irrespective of the respectively prevailing driving condition, no critical reaction occurs which would make the vehicle difficult or impossible to handle for the driver. Therefore, according to the invention, a vehicle which steers at least in a neutral manner is achieved. The steering angle determines the curve radius, even when the speed or the lateral acceleration of the vehicle changes. If understeering occurs, this places no particular demands on the driver, since, for example in a front wheel drive vehicle, merely an increase in the steering angle is required when driving around a bend at correspondingly high speeds. This increase is realized automatically by the subject of the invention. An understeering vehicle thus remains stable with a fixed steering angle. The reference value adaption circuit prevents an oversteering behavior from occurring since, above a critical speed, this would lead to instability with a fixed steering angle. By means of the dynamic timing function stage provided according to the invention, the correcting intervention of the controller can be determined as a function of time so that optimum conditions for driving around a bend are obtained. All in all, the current reaction of the vehicle is compared by the controller to the reaction of an ideal vehicle, the controller compensating deviations arising between the current reaction and that of the ideal model, and the t:,ming of this compensation being influenced by means of the dynamic timing function stage. Of course, in this process practical limits are placed on the controller, since if the model response of the ideal vehicle deviates too much from the reaction of the real vehicle, such large corrections are necessary that they have to be or can be limited. A limitation of this kind can be achieved by a correspondingly limited precedence of the controller relative to the driver. An advantage of the present device is that critical situations of the driving condition can be controller, by means of the steering support according to the invention, more easily by the driver than without control support. Another advantage is that the control system extends the control capabilities of the driver. This is possible in particular because the driver is relieved of undesired effects, which is ensured in particular by the neutral or understeering behavior and by the individual timing (dynamic) influence which is exerted by the timing function stage and is independent, in particular, of specific driving condition data.

According to a further development of the invention, it is provided for the evaluation stage to carry out an evaluation with a factor which is smaller than or a maximum of "1". This evaluation ensures a neutral or understeering behavior.

The timing function stage can be constructed according to a further exemplary embodiment of the invention as a delay element. In particular, a delay element of the first order ($PT_1$-element) is used. For the aforesaid neutral or understeering behavior, the output variable of the timing function stage assumes a maximum value of "1".

If the timing function stage supplies output values which per se are greater than "1", the factor of the evaluation stage connected upstream of it is selected in such a way that the output variable of the entire circuit (evaluation stage and timing function stage) assumes a maximum value of "1".

Preferably, the factor of the evaluation stage is dependent on one or more driving conditions variables, in particular the driving speed. This can also be realized in the timing function stage, that is to say that its output variable is a time-dependent function of one or more driving condition variables, in particular the driving speed.

IN a further development of the invention, it is provided for the locking angle of the steering wheel to be supplied as a first input variable to a multiplier, to which the driving speed is fed as a second input variable, and for the input variable constituting the product of the first and second input variable to the connected to a dimensioning circuit which takes account of the geometric dimensions of the chassis. A corresponding sensor is provided for the detection of the locking angle. This also applies for the detection of the driving speed, preferably the tachometer being used.

Preferably, the dimensioning circuit forms the reciprocal value of the wheel base of the vehicle provided with front and rear axle. All in all, the so-called Ackermann condition is fulfilled by the multiplier and by the dimensioning circuit.

According to a further development of the invention, it is provided for the locking angle to be fed to a summing point to which the output of the controller is connected as a further input variable, and in that the output of the summary point serves as actuating variable for the steerable wheel. This arrangement leads to the steering angle of the steerable wheel resulting from the steering wheel adjustment being corrected.

Preferably a reference value adaption circuit is constructed in such a way that its output variable is a desired yaw velocity of the vehicle. "Desired yaw velocity" is defined as the output variable supplied by the described model reference control system according to the invention.

The actual yaw velocity of the vehicle is preferably identified by sensors or calculated from the data of one or more driving condition data, if appropriate in conjunction with vehicle data. It is fed to the controller as an actual value.

If it is intended to make the control process dependent not on the yaw velocity of the vehicle but rather on the lateral acceleration, a squaring circuit, to which the driving speed is fed, is switched upstream of the second input of the multiplier. The squaring circuit thus forms the square of the driving speed so that the product of the desired yaw velocity and of the driving speed is made available at the output of the reference value adaption circuit, which corresponds to the lateral acceleration. The lateral acceleration is supplied to a summing point of the controller, to which point the actual lateral acceleration of the vehicle is also connected. The latter is measured by sensors or calculated by means of driving condition variables, if appropriate in conjunction with vehicle variables.

Finally, it is advantageous if the output variable of the controller and/or the locking angle of the steering wheel control the steerable front and/or rear wheels of the vehicle. In this arrangement, a multiplicity of variations are conceivable. The vehicle can have front-wheel drive or rear-wheel drive or even front and rear-wheel drive. Consequently, it is possible to control the front wheels by means of the steering wheel and the rear wheels by means of the controller. This can also occur the other way round, that is to say the front wheels are controlled by the controller and the rear wheels by the steering wheel. Furthermore, by intermediately connecting a suitable summing point, a front wheel control is possible in such a way that both the steering wheel and the controller act on the front wheels. The rear wheels are then not controlled. According to a different embodiment, the front wheels are not controlled but rather steering wheel and controller act on the rear wheels. It is also possible for the front wheels to be controlled by the steering wheel and by the controller, and the rear wheels exclusively by the controller. The latter can also occur the other way round, that is to say the front wheels are controlled by the controller and rear wheels by the steering wheel and the controller. Finally, there is also the following variant: front and rear wheels are controlled both by the steering wheel and also by the controller.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 1 shows a block circuit diagram of a device according to the present invention for adjusting the steering angle of at least one steerable wheel, the device being provided with a reference value adaption circuit;

FIG. 2 shows the reference value adaption circuit in greater detail; and

FIG. 3 shows a alternative embodiment of the present invention.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

The block circuit diagram according to FIG. 1 shows a driver 1 of a vehicle 2. The vehicle 2 moves along a road 3 which has corresponding unevennesses, a corresponding slope etc. The driver 1 carries out steering commands 4, brake commands 5 and acceleration commands 6 (depressing accelerator pedal). The latter brings about a multiplicity of interference effects 7 on the vehicle 2. The steering command 4 is fed to a summing point 8 as an input variable to which a further input variable 9 is connected. The input variable 9 is the output variable of a controller 10. The output 11 of the summing point 8 constitutes an actuating variable 12 for the wheels (not illustrated) to be steered of the vehicle 2.

From the above it is clear that a steering command 4 brought about by the locking angle of the steering wheel of the vehicle 2 leads to a desired steering angle $\alpha_d$ and that—by addition with the output variable 9 of the controller 10—a corrected steering angle $\alpha$ is formed. The steerable wheels of the vehicle 2 are accordingly locked with the corrected steering angle $\alpha$.

The desired steering angle $\alpha_d$ is also fed to a reference value adaption circuit 13, at whose output 14 a reference value 15 is available, the reference value—having a positive sign being supplied to a summing point 16.

The vehicle 2 has non-adjusted sensors which detect the respective driving condition, form which sensors an actual value 17 is formed. The actual value 17 is supplied via the line 18—with negative sign—to the summing point 16. The output 19 of the summing point 16 makes the input variable (control deviation 20) for the controller 10 available.

The driver 1 is notified of the actual variable via the operative connection 21 indicated symbolically in FIG. 1 for the sake of clarity, that is to say the driver will change the locking angle of the steering wheel—according to the driving conditions—so that the respectively desired control angle $\alpha_d$ is adjusted.

FIG. 2 shows a part of the illustration according to FIG. 1. The driver 1, vehicle 2, controller 10 and the summing points 8 and 16 are illustrated. The reference value adaption circuit 13 is illustrated in detail. It is composed of a multiplier 22, a dimensioning circuit 23 connected downstream of the latter, an evaluation stage 24 and a timing function stage 25.

The steering angle $\alpha_d$ desired by the driver 1 is outputted as a first input variable 26 to the multiplier 22. Sensors (not illustrated) identify the driving speed u of the vehicle 2 which is connected as a second input variable 27 to the multiplier 22. The output variable 28 of the multiplier 22 is outputted to the dimensioning circuit 23, the output 29 of which leads to the evaluation stage 24. The output 30 of the evaluation stage 24 is connected to the input 31 of the timing function stage 25 which at its output 32 has the reference value 15 which—as already described—is transmitted to the summing point 16.

The driving speed u is also transmitted via the lines 33 and 34 to the evaluation stage 24 and the timing function stage 25.

Reference value adaption circuit 13 is constructed in such a way that the dimensioning circuit 23 forms the reciprocal value of the wheel base of the vehicle provided with a front and rear axle. The wheel base is composed of the sections a and b. Section a is the distance between the front axle and the center of gravity of the vehicle, and section b is the distance between the center of gravity and the rear axle of the vehicle.

The evaluation circuit 24 performs an evaluation of its input variable with a factor (F(·)). This factor (F(·)) can be dependent on one or more driving condition variables. This is indicated in the FIG. 2 by the point placed in brackets; that is to say the bracketed expression can contain one or more driving condition variables. In the exemplary embodiment illustrated in FIG. 2, the driving speed u is considered as the driving condition variable. The driving speed—as described—is transmitted from the vehicle 2 to the evaluation circuit 24 via electrical line 33.

The timing function stage 25 has a function Y (t), that is to say it evaluates its input variable with a time-dependent variable. This variable can be dependent on one or more driving condition variables. In this respect, the comments already made above relating to the evaluation stage 24 apply correspondingly. In the embodiment of FIG. 2, the driving speed u is fed to the timing function circuit 25. The time dependency of the timing function stage 25 is constructed in the illustrated exemplary embodiment as a delay element, in particular as $PT_1$-element. This means that the signal transmitted via input 31 arrives, with a delay because of the $PT_1$-element, at the output 32 of timing function stage 25 the magnitude of the delay being dependent on the driving speed u.

In the exemplary embodiment in FIG. 2, the desired yaw velocity $r_d$ of the vehicle 2 is transmitted as reference value 15 to summing point 16, that is to say, as output variable of the reference value adaption circuit 13. Correspondingly, the actual yaw velocity r of the vehicle 2 identified by sensor (s) is supplied as an actual value 17 to summing point 16 via the line 18.

The factor (F(·)) of the evaluation stage 24 is selected in such a way that the reference value 15 is smaller or at maximum equal to "1". In this way, it is ensured that the vehicle 2 has an understeering or, at most, a neutral behavior when driving around bends. The multiplication performed in the multiplier 22 of the desired steering angle $\alpha_d$ by the driving speed u and the subsequent evaluation by the dimensioning circuit 23 leads to the so-called Ackermann condition which is loaded by the evaluation stage 24 with a corresponding factor (F(·)) and subsequently passes through the timing function stage 25.

In FIG. 3, a further exemplary embodiment of the invention is illustrated. In modification of the previous comments, a squaring circuit 35 is connected upstream of the second input of the multiplier 22. The squaring circuit is supplied at the input thereof with the driving speed u as input variable 36. Therefore, the second input variable 27 of the multiplier 22 constitutes the square of the driving speed u. Thus, the desired yaw speed $r_d$ (FIG. 2) multiplied by the driving speed u is available at the output 32 of the reference value adaption circuit 13. This produces the desired yaw acceleration $A_d$ which is connected as reference value 15 to the summing point 16. Accordingly, the actual lateral acceleration A which is identified by suitable sensors (not shown) is supplied to the summing point 16 as actual value 18.

A comparison of FIGS. 2 and 3 shows that the corrected steering angle $\alpha$ which influences the position of the front wheels of the vehicle 2 is supplied to the vehicle 2 according to FIG. 2. The rear wheels are not controlled. On the other hand, in FIG. 3 both the front and rear wheels of the vehicle 2 are controlled. This occurs in such a way that both the locking angle, predetermined by the steering wheel position, and the controller output variable act on the front wheels and the position of the rear wheels is influenced exclusively by the controller 10. In practice, other variants are also conceivable; for these refer to the corresponding embodiments in the introduction to the description.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

I claim:

1. In a vehicle having a plurality of steerable wheels and a steering wheel, an apparatus for adjusting the steering angle of at least one steerable wheel of the vehicle, said apparatus comprising:
    sensor means for sensing the steering angle of the vehicle steering wheel, the speed of the vehicle, and a vehicle state variable of the vehicle, said steering angle selected by a driver of the vehicle, said sensor means generating an output signal; and
    a controller connected to said sensor means and receiving said sensor means output signal, said controller determining a reference value for said vehicle state variable which is dependent on the vehicle speed and the steering angle;
    said controller correcting the steering angle of said steerable wheel such that the vehicle has an understeering steering performance.

2. The apparatus of claim 1, wherein said control device produces a reference value causing the curve radius of the vehicle at a steering angle selected by the driver to become greater at increasing vehicle speeds.

3. The apparatus of claim 1, wherein the reference value for the vehicle state variable is determined in a reference value adaptation circuit by means of a vehicle model.

4. The apparatus of claim 3, wherein said reference value adaptation circuit includes an evaluation circuit for valuation of the reference value.

5. The apparatus of claim 4, wherein said reference value adaptation circuit includes a dynamic timing function circuit for valuing said reference value with a time dependent variable.

6. The apparatus of claim 5, wherein said dynamic timing function circuit is a delay element.

7. The apparatus of claim 6, wherein said delay element is a $PT_1$-element.

8. The apparatus of claim 5, wherein said dynamic timing function circuit output has an amplitude which is dependent on at least one driving condition variable.

9. The apparatus of claim 5, wherein said dynamic timing function circuit outputs an electrical signal having a maximum value of "1".

10. The apparatus of claim 5, wherein said evaluation circuit outputs an electrical signal causing the output of the dynamic timing function circuit to have a maximum value of "1".

11. The apparatus of claim 4, wherein said evaluation circuit outputs an electrical signal having a value smaller than or at maximum equal to "1".

12. The apparatus of claim 11, wherein said evaluation circuit output is dependent on one or more driving condition variables.

13. The apparatus of claim 4, wherein said evaluation circuit output has an amplitude which is dependent on at least one driving condition variable.

14. The apparatus of claim 3, wherein said reference value adaptation circuit further comprises a multiplier and dimensioning circuit, locking angle of the steering wheel is supplied as first input variable to a multiplier, to which, as second input variable, the driving speed is fed, and in that the output variable constituting the product of the first and second input variable is connected to a dimensioning circuit which takes account of the geometric dimensions of the chassis of the vehicle, said sensor output corresponding to the locking angle and driving speed of the vehicle.

15. The apparatus of claim 14, wherein the vehicle has a front and rear axle defining a wheel base, said dimensioning circuit having an output dependent upon the reciprocal value of said wheel base.

16. The apparatus of claim 14, further comprising a squaring circuit having an input and output, said squaring circuit input electrically connected to said sensor output, said squaring circuit output electrically connected to said multiplier input, said sensor output corresponding to a driving speed of the vehicle.

17. The apparatus of claim 1, wherein the vehicle state variable is the actual yaw velocity of the vehicle sensed by said sensing means, said yaw velocity used to determine said reference value of the vehicle.

18. The apparatus of claim 1, wherein said vehicle state variable is the actual transverse acceleration of the vehicle which is sensed by said sensing means, said control device determining a reference value for said transverse acceleration of said vehicle.

19. In a vehicle having a plurality of steerable wheels and a steering wheel, an apparatus for adjusting the steering angle of at least one steerable wheel of the vehicle, said apparatus comprising:
sensor means for sensing the steering angle of the vehicle steering wheel, the speed of the vehicle, and a vehicle state variable of the vehicle said steering angle selected by a driver of the vehicle, said sensor means generating an output signal; and
a controller connected to said sensor means and receiving said sensor means output signal, said controller determining a reference value for said vehicle state variable which is dependent on the vehicle speed and the steering angle;
said controller correcting the steering angle of said steerable wheel such that the vehicle has a neutral steering performance.

20. The apparatus of claim 19, wherein said controller provides a reference value causing the curve radius of the vehicle at a steering angle selected by the driver to remain the same at increasing vehicle speeds.

21. The apparatus of claim 19, wherein said reference value for the vehicle state variable is determined in a reference value adaptation circuit by means of a vehicle model.

22. The apparatus of claim 21, wherein said reference value adaptation circuit features an evaluation circuit for valuation of the reference value.

23. The apparatus of claim 22, wherein said reference value adaptation circuit includes a dynamic timing function circuit for valuing said reference value with a time dependent variable.

24. The apparatus of claim 19, wherein said vehicle state variable is the actual transverse acceleration of the vehicle sensed by said sensing means, said controller determining said reference value for the transverse acceleration of the vehicle.

25. The apparatus of claim 19, wherein said locking angle is outputted to a summing point to which the output of the controller is connected as a further input variable, and in that the output of the summing point serves as actuating variable for the steerable wheel.

26. The apparatus of claim 19, wherein said reference value adaption circuit output corresponds to a desired yaw velocity of the vehicle.

27. The apparatus of claim 19, wherein said sensor output corresponds to an actual yaw velocity of the vehicle.

28. The apparatus of claim 19, wherein said sensor output corresponds to an actual lateral acceleration of the vehicle.

* * * * *